US010880771B2

(12) United States Patent
Jiang et al.

(10) Patent No.: US 10,880,771 B2
(45) Date of Patent: Dec. 29, 2020

(54) NULL DATA PACKET ANNOUNCEMENT BASED RANGE ESTIMATION

(71) Applicant: Intel IP Corporation, Santa Clara, CA (US)

(72) Inventors: Feng Jiang, Santa Clara, CA (US); Qinghua Li, San Ramon, CA (US); Chittabrata Ghosh, Fremont, CA (US); Yuval Amizur, Kfar-Saba (IL); Robert J. Stacey, Portland, OR (US); Jonathan Segev, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 57 days.

(21) Appl. No.: 16/346,469

(22) PCT Filed: Jun. 27, 2017

(86) PCT No.: PCT/US2017/039481
§ 371 (c)(1),
(2) Date: Apr. 30, 2019

(87) PCT Pub. No.: WO2018/101984
PCT Pub. Date: Jun. 7, 2018

(65) Prior Publication Data
US 2019/0281484 A1  Sep. 12, 2019

Related U.S. Application Data

(60) Provisional application No. 62/427,896, filed on Nov. 30, 2016.

(51) Int. Cl.
*H04W 24/10* (2009.01)
*H04L 1/00* (2006.01)
(Continued)

(52) U.S. Cl.
CPC .......... *H04W 24/10* (2013.01); *H04L 1/0026* (2013.01); *H04W 56/00* (2013.01);
(Continued)

(58) Field of Classification Search
CPC ..................................................... H04W 24/10
See application file for complete search history.

(56) References Cited

U.S. PATENT DOCUMENTS 10,715,995 B2 * 7/2020 Segev ................... H04L 5/0048
2015/0085777 A1  3/2015 Seok
(Continued)

FOREIGN PATENT DOCUMENTS

WO  WO-2016167608 A1  10/2016
WO  WO-2018101984 A1  6/2018

OTHER PUBLICATIONS

"International Application Serial No. PCT/US2017/039481, International Search Report dated Oct. 26, 2017", 3 pgs.
(Continued)

*Primary Examiner* — John D Blanton
(74) *Attorney, Agent, or Firm* — Schwegman Lundberg & Woessner, P.A.

(57) ABSTRACT

Methods, apparatuses, and computer-readable medium are described for doing fine timing measurements for one or more stations. A trigger frame is encoded for stations. Uplink null data packets are received. A time of arrival for the UP NDP and a time of departure for a downlink null data packet are determined. The time of arrival and time of departure are encoded into a data packet, such as a downlink null data packet announcement. A wireless device is configured to transmit the data packet to a station.

18 Claims, 13 Drawing Sheets

(51) Int. Cl.
*H04W 64/00* (2009.01)
*H04W 72/04* (2009.01)
*H04W 80/02* (2009.01)
*H04W 56/00* (2009.01)
*H04W 84/12* (2009.01)

(52) U.S. Cl.
CPC ....... *H04W 56/001* (2013.01); *H04W 64/003* (2013.01); *H04W 72/0446* (2013.01); *H04W 80/02* (2013.01); *H04W 84/12* (2013.01)

(56) References Cited

U.S. PATENT DOCUMENTS

| | | | | |
|---|---|---|---|---|
| 2015/0094103 | A1* | 4/2015 | Wang | H04W 4/023 |
| | | | | 455/456.6 |
| 2015/0319747 | A1 | 11/2015 | Chu et al. | |
| 2016/0295581 | A1 | 10/2016 | Ghosh et al. | |
| 2017/0033898 | A1* | 2/2017 | Chun | H04B 7/0452 |
| 2017/0127440 | A1* | 5/2017 | Chun | H04W 72/1284 |
| 2017/0171766 | A1* | 6/2017 | Amizur | H04W 24/08 |
| 2017/0251332 | A1* | 8/2017 | Aldana | G01S 5/0226 |
| 2017/0295004 | A1* | 10/2017 | Amizur | H04L 5/0078 |
| 2018/0027561 | A1* | 1/2018 | Segev | H04L 5/0091 |
| | | | | 370/329 |
| 2018/0048742 | A1* | 2/2018 | Venkatesan | H04L 69/24 |
| 2018/0131540 | A1* | 5/2018 | Malik | H04L 27/2663 |
| 2018/0331749 | A1* | 11/2018 | Ghosh | H04L 5/0048 |
| 2019/0191323 | A1* | 6/2019 | Venkatesan | H04W 74/006 |
| 2020/0245297 | A1* | 7/2020 | Venkatesan | H04L 5/0055 |

OTHER PUBLICATIONS

"International Application Serial No. PCT/US2017/039481, Written Opinion dated Oct. 26, 2017", 4 pgs.

* cited by examiner

NULL DATA PACKET ANNOUNCEMENT BASED RANGE ESTIMATION

PRIORITY CLAIM

This application is a U.S. National Stage Filing under 35 U.S.C. 371 from International Application No. PCT/US2017/039481, filed Jun. 27, 2017 and published in English as WO 2018/101984 on Jun. 7, 2018, which claims priority to U.S. Provisional Patent Application Ser. No. 62/427,896 filed Nov. 30, 2016, entitled "NULL DATA PACKET ANNOUNCEMENT (NDPA) BASED MEASUREMENT PROTOCOL FOR RANGE ESTIMATION IN WIRELESS LOCAL AREA NETWORK (WLAN)" each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for a null data package announcement based range estimation.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
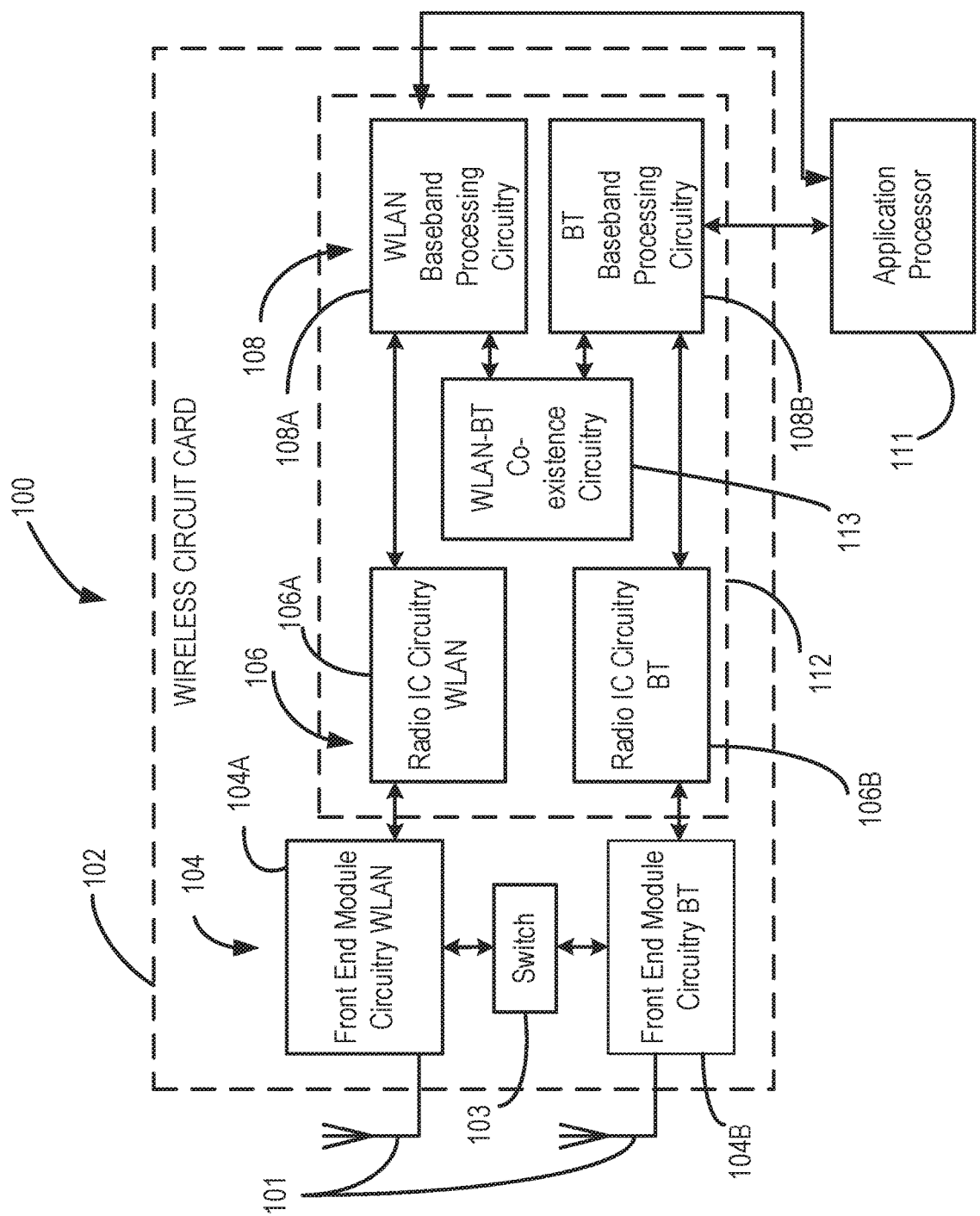
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 102, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108b. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108b and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108b. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108b may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108b to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
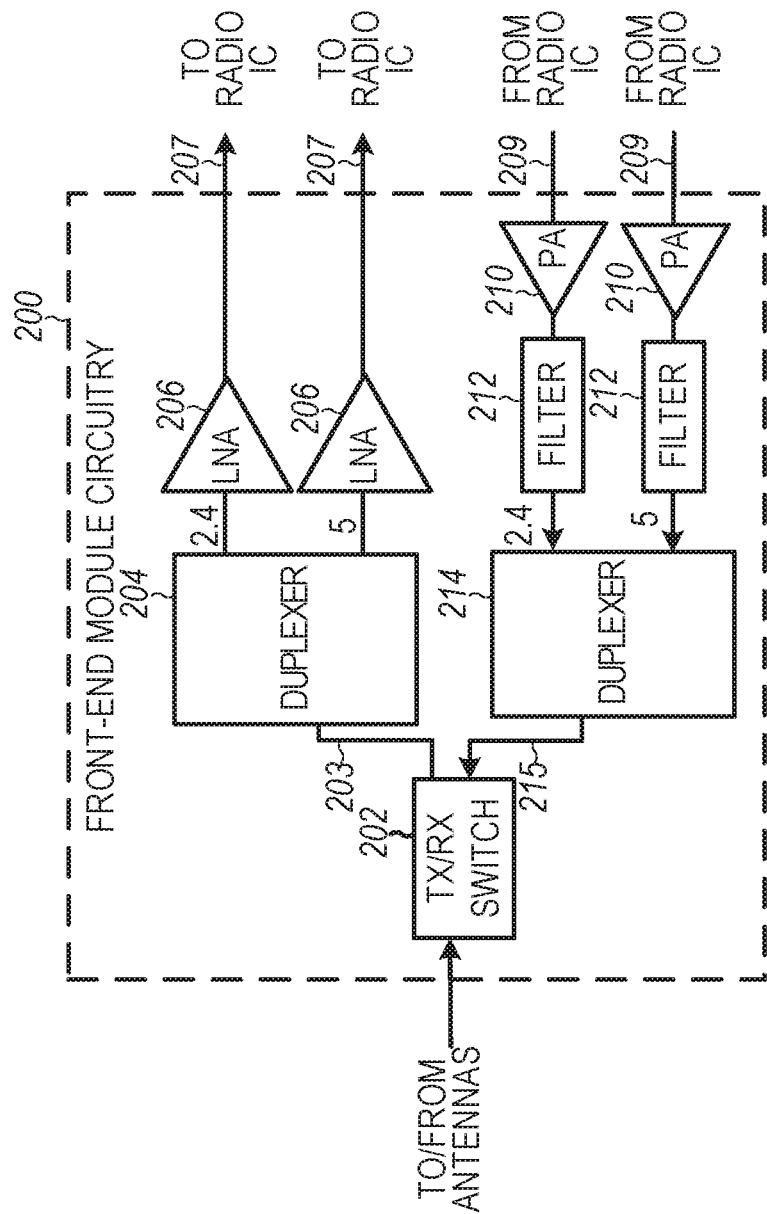
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
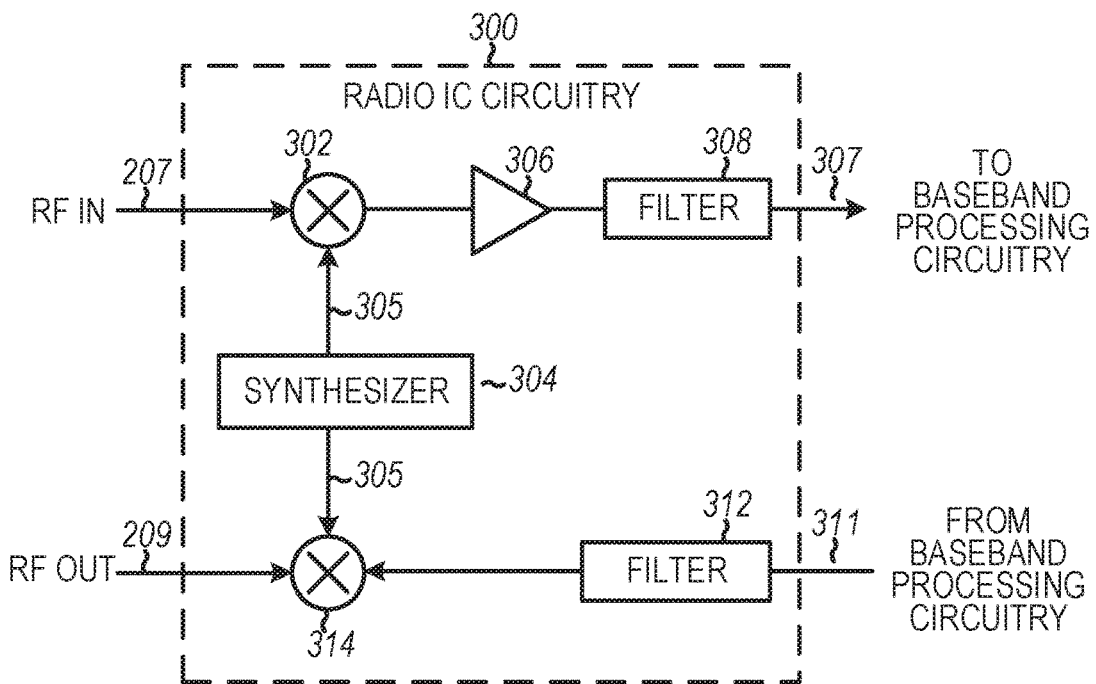
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
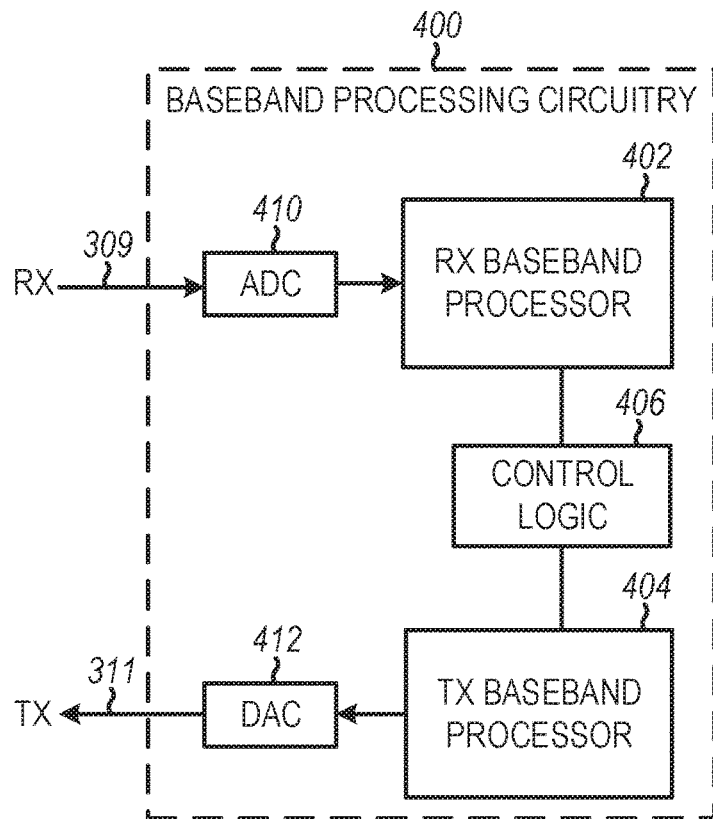
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
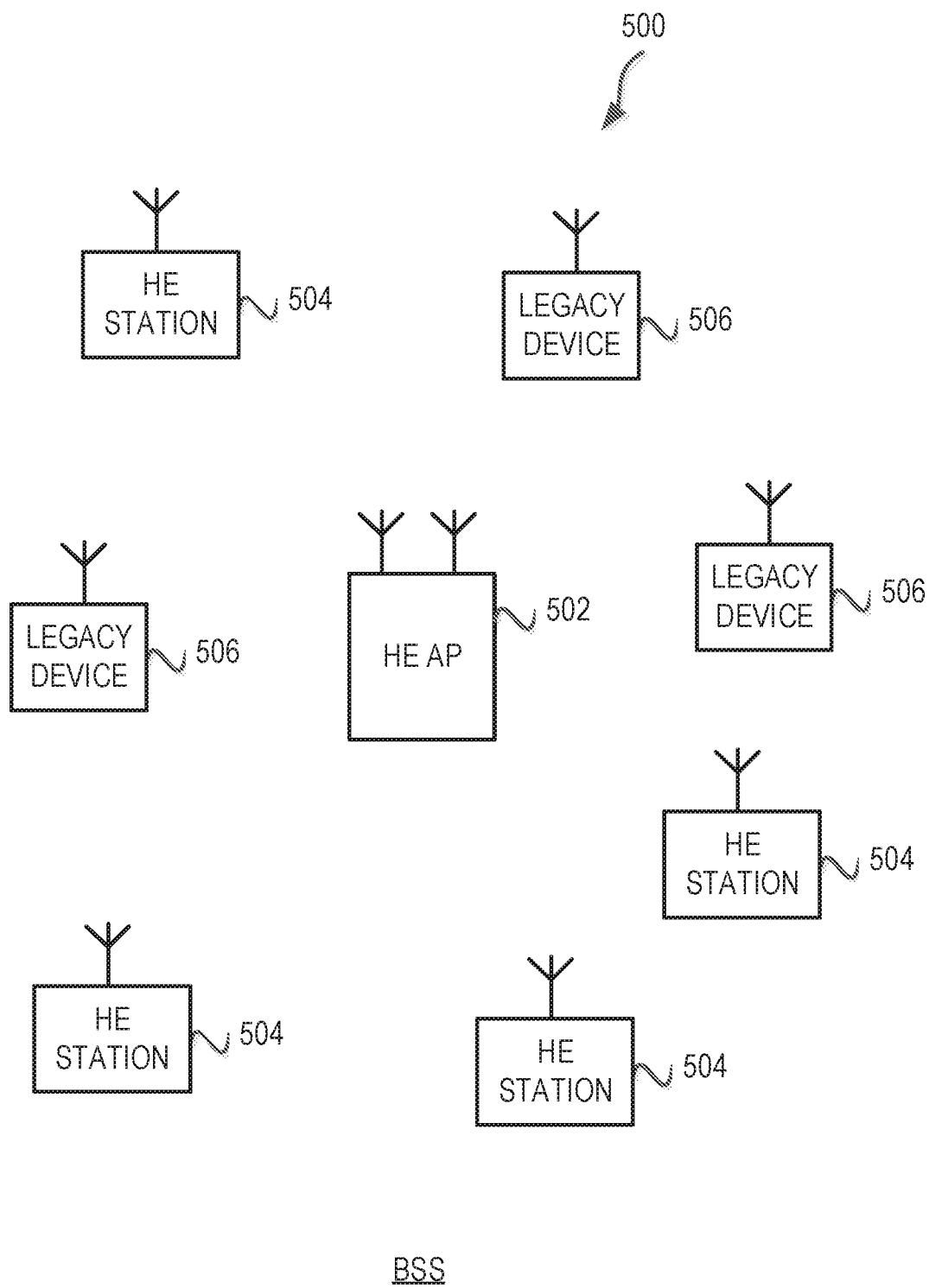
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be stations (STAs) or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or subcarriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-12.

In example embodiments, the HE station 504 and/or the HE AP 502 are configured to perform the methods and operations/functions described herein in conjunction with FIGS. 1-12. In example embodiments, an apparatus of the HE station 504 and/or an apparatus of the HE AP 502 are configured to perform the methods and functions described herein in conjunction with FIGS. 1-12. The term Wi-Fi may refer to one or more of the IEEE 802.11 communication standards. AP and STA may refer to HE access point 502 and/or HE station 504 as well as legacy devices 506.

In some embodiments, a HE AP 502 or a HE STA 504 performing at least some functions of an HE AP 502 may be referred to as HE AP STA. In some embodiments, a HE STA 504 may be referred to as a HE non-AP STA. In some embodiments, a HE STA 504 may be referred to as either a HE AP STA and/or HE non-AP.

In some embodiments, systems/devices/methods described herein provide measurement protocols for next generation positioning protocol in WLAN (802.11az), which enhances the existing methods. In some embodiments, in the IEEE 802.11 specification, the protocol that can be used to measure the distance between AP and STA is called fine timing measurement (FTM) protocol. In some embodiments, the FTM protocol utilizes the round trip time (RTT) between the AP and STA to determine the range of STA.

After the AP receives the range estimation request from STA, several packets will be exchanged between AP and STA and the RTT is derived based on these packets. Previous specifications had two limitations with the FTM protocol. First, in each packet exchange procedure it only allows the AP to conduct timing measurement for a single STA. When the AP needs to assist several STAs to measure the RTTs, the measurements can only be done sequentially and the efficiency of FTM is limited. The second limitation is that FTM doesn't utilize MIMO antennas to improve the estimation accuracy of RTT. In some embodiments, in the next generation WLAN (802.11ax), a new feature is the multi-user MIMO in the uplink transmission from STAs to AP, and based on this feature, more efficient measurement protocols are designed for range estimation.

In some embodiments, systems/devices/methods described herein provide new designs using MIMO antennas and the IEEE 802.11ax uplink MU-MIMO feature. In some embodiments, the AP can exchange timing measurement packets with multiple STAs simultaneously, which will reduce the number of packet exchanges between AP and STA significantly. Second, various embodiments described below exploit the benefit of MIMO to improve the accuracy of RTT estimation. Third, various embodiments described below are more compatible with the 802.11ax specification. Various embodiments, therefore, require minimal change to the existing hardware.

In some embodiments, systems/devices/methods described herein enable the AP to exchange the measurement packets with multiple STAs simultaneously. Furthermore, in some embodiments, for the uplink transmission, the trigger-based physical layer convergence protocol (PLCP) protocol data unit (PPDU) in IEEE 802.11ax can be utilized to allow the stations to transmit sounding packets to the AP simultaneously. For the downlink transmission from AP to STA, the AP may send a null data packet (NDP) announcement (NPDA) and NDP sounding packets to all the STAs. After the two rounds of packet exchanges, both AP and STAs will obtain the time of arrival (ToA) and time of departure (ToD) information, and the RTT can be calculated using these ToA and ToD information.

Figure 6:
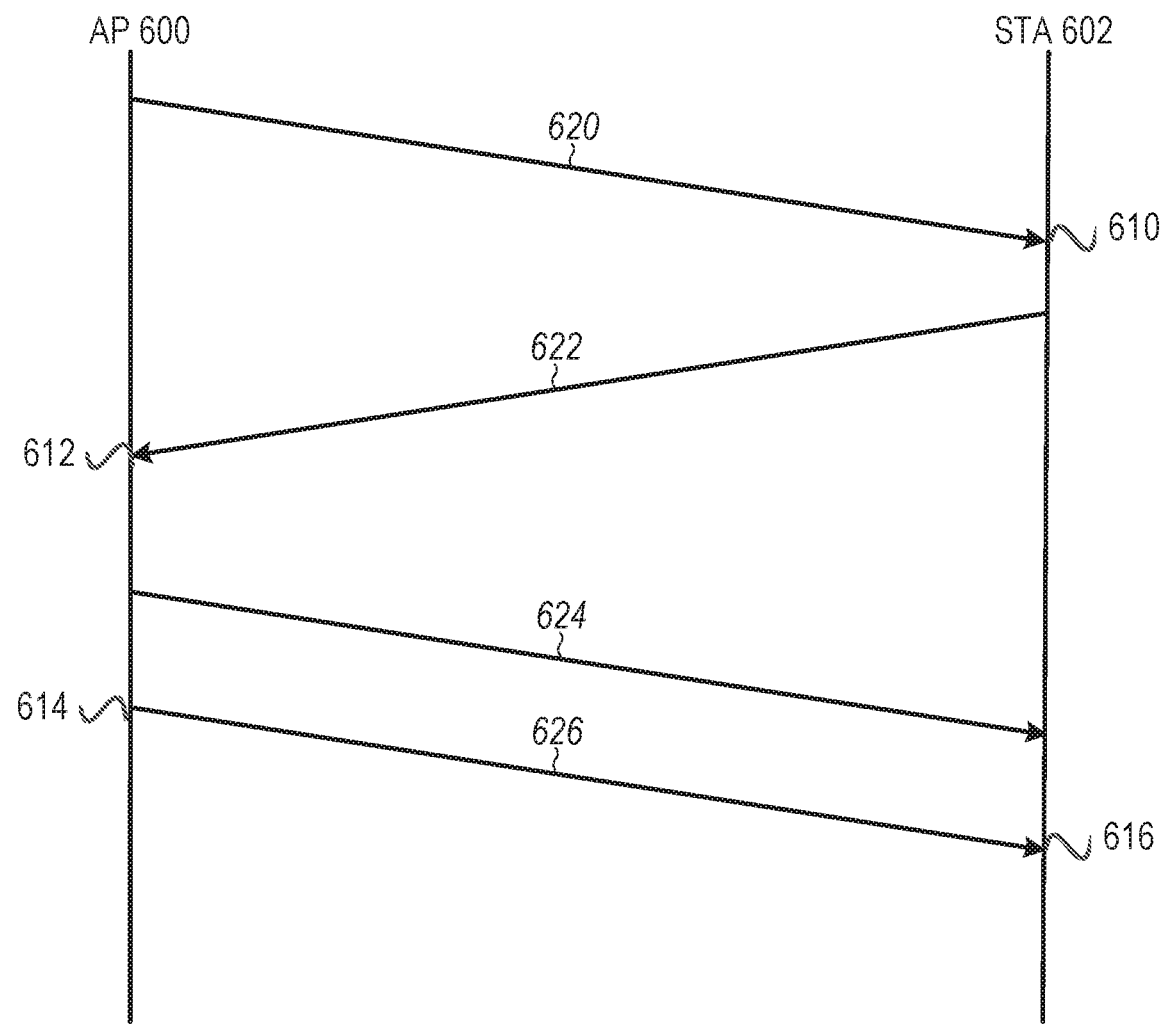
FIG. 6 illustrates packet timing for range estimation in accordance with some embodiments.

FIG. 6 illustrates packet timing for range estimation in accordance with some embodiments. A packet 620, such as a trigger frame, may be sent from an AP 600 to a station 602. After received the packet 620, the station 602 may wait a short interframe space (SIFS) and then transmit a second packet 622. The time of departure 610 of the packet 622 may be considered t1. As described in greater detail below, the packet 622 may be an UL NDP. The combination of packet 620 and packet 622 may be considered a UL sounding portion of the range estimation process.

The AP 600 may determine the time of arrival (ToA) 612 of the packet 622, which may be considered t2. In response to receiving packet 622, the AP 600 may send packets 624 and 626. As described in greater detail below, the AP 600 may determine the time of departure (ToD) 614 of the packet 626. The ToD 614 may be considered t3. In an example, the ToD 614 is determined prior to packets 624 and 626 being transmitted to the station 602. In this example, the ToD 614 may be included in the packet 624. In addition, the ToA 612 may also be included in packet 624. In another example, the ToD 614 may be included in additional messaging not shown in FIG. 6. In an example, the packet 624 is a DL NDPA and the packet 626 is a DL NDP.

Upon receipt of the packet 624, the station 602 will expect to receive the packet 626. The ToA 616 of the packet 626 may be considered t4. Once the packet 626 is received, the station 602 may have the times t1, t2, t3, and t4. Based upon these times, the station 602 may determine the RTT of a packet between the station 602 and the AP 600. In an example, where the packet 624 includes the ToD 614 and the ToA 612, the station 602 may calculate the RTT after four frames of data have been exchanged between the AP 600 and the station 602.

Figure 7:
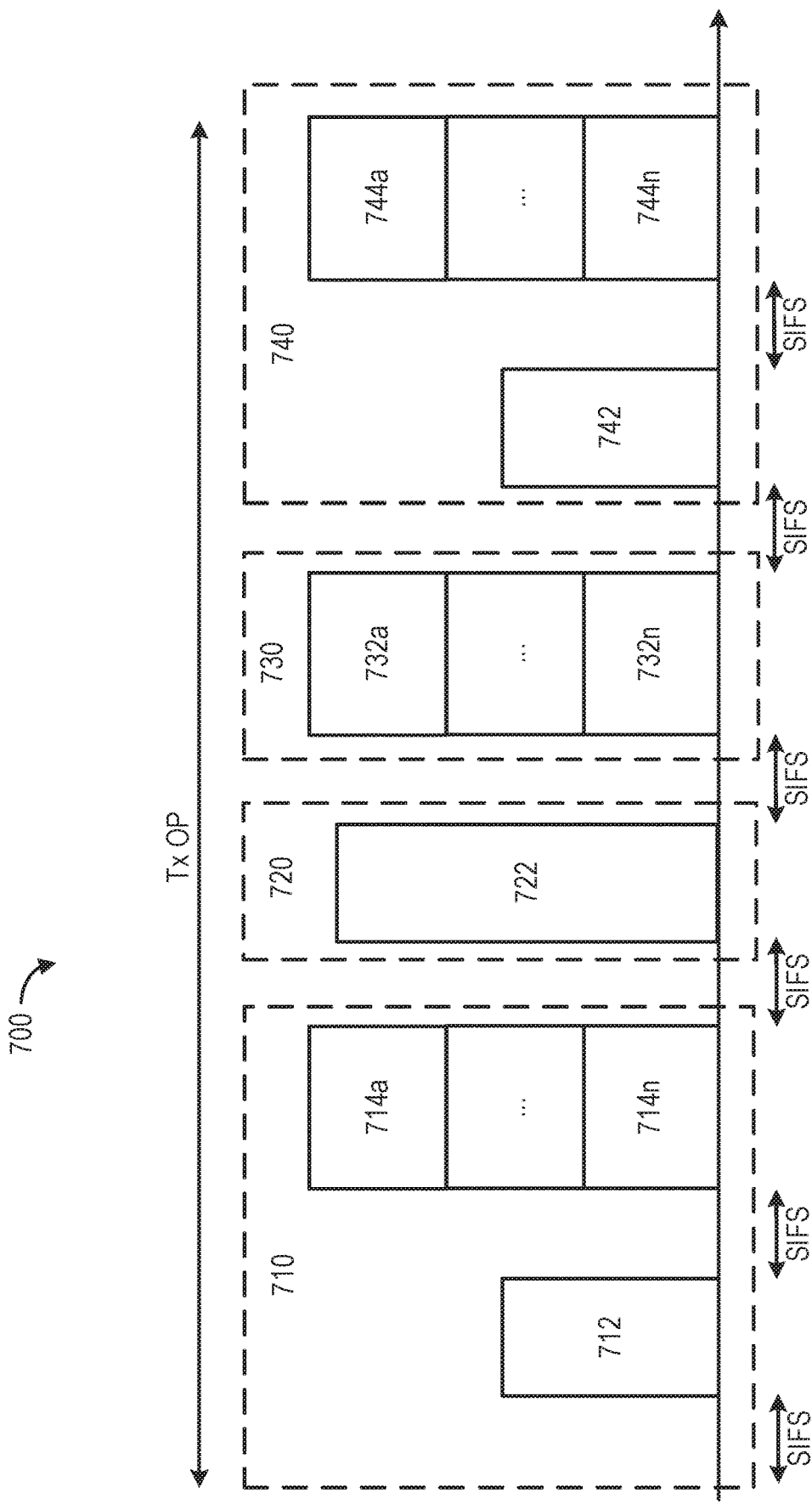
FIG. 7 illustrates a packets exchange sequence, which uses 6-packets to finish a single measurement, in accordance with some embodiments.

In some embodiments, there can be a reference design considered by IEEE 802.11az, and the packets exchange sequence of this design is illustrated in FIG. 7. FIG. 7 illustrates a packets exchange sequence 700, which uses 6-packets to finish a single measurement, in accordance with some embodiments.

In an UL sounding portion 710, a trigger frame 712 is broadcast from an access point to one or more stations. After a SIFS, one or more stations may respond by transmitting an UL NDP 714a-714n. Next, a DL sounding portion 720 may be done. In FIG. 7, the DL sounding portion 720 includes a DL NDP 722. In the packet exchange sequence 700, the trigger frame 712 provides an indication that a range estimation process is starting. The DL NDP 722, however, does not immediately follow the trigger frame 712. This may require significant changes to a station's receiver state machine based upon some current wireless standards, e.g., 802.11ax. In some examples below, the packet exchange sequence is more aligned with standards such as 802.11ax.

After the DL sounding portion 720 is complete, an AP2STA portion 730 and a STA2AP portion 740 may be done. The AP2STA portion 730 may include a location measurement report (LMR), e.g., 732a-732n, sent from the AP to one or more stations. The LMRs 732a-732n may provide timing information that allows the stations to calculate an RTT. After the LMR report, another trigger frame 742 may sent to the stations. In response, the stations may transmit a LMR, e.g., 744a-744n, to the access point. The LMRs 744a-744n may provide timing data such that the AP may calculate an RTT.

In some embodiments described below, optimizations and improvements upon the packets exchange sequence 700 are provided. In some embodiments, a main difference between embodiments described below and the packets exchange sequence 700 is that in some embodiments, a NDP announcement packet is added before the DL NDP, such that the packet exchange sequence is better compatible with the IEEE 802.11ax specification.

In embodiments described in greater detail below, the AP may use a trigger frame to solicit the uplink transmission packets from multiple STAs. In addition, the AP may first send an NDP announcement packet (NDPA), then after a short interframe space (SIFS) of the NDPA packet, the AP transmits a NDP packet. The STAs can use the NDP packet to determine the channel response. The NDPA provides the STA with a notification for receiving the NDP packet.

Various systems/devices/methods are described below and illustrated in FIGS. 8-12. In some embodiments, the measurement sequence includes two parts, the first part is sounding frame exchange and the second is the measurement data exchange. In some embodiments, the sounding exchange consists of four steps, AP's trigger frame, the uplink sounding frames, the downlink sounding announcement frame, and the downlink sounding frame. The uplink sounding frames can be P-matrix encoded as in IEEE 802.11ax or in TDMA fashion for mitigating the near-far effect. The second part is for measurement data exchange, and may consist of one or two frames. The two frames may be sent in different directions e.g., downlink and uplink. In some embodiments, the measurement data can be a measured channel state information (CSI) report or a location measurement report (LMR). The time interval between the frames in each phase is SIFS. The time interval between the two phases can be SIFS or greater e.g., a few milliseconds. The additional time beyond SIFS may be due to the amount of time needed by the AP to compute the measurement report. In some embodiments, the packets may be sent over different transmit opportunities. In other embodiments, the packets may all be sent in a single transmit opportunity.

Figure 8:
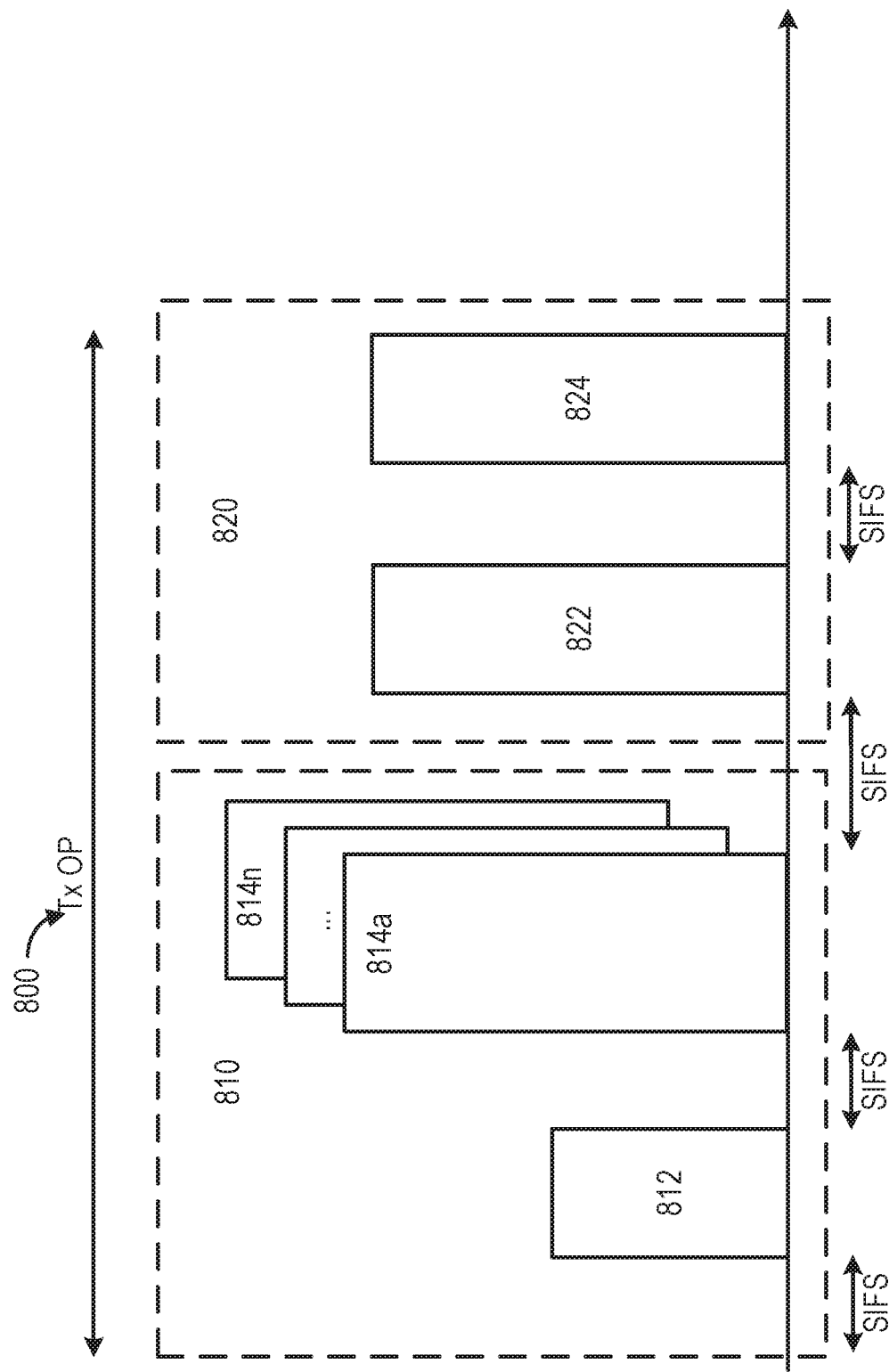
FIG. 8 illustrates a timing diagram where an access point may determine a time or arrival in real time and a mobile station can determine a round trip time (RTT) in accordance with some embodiments.

FIG. 8 illustrates a timing diagram 800 where an access point may determine a time of arrival in real time and a mobile station can determine a round trip time (RTT) in accordance with some embodiments. In this case, the AP has the capability to determine the ToA in real time (e.g., within a SIFS) using the uplink NDP (UL NDP). In an example, the ToA is determined based upon the actual receipt of the UL NDP. In an embodiment, the AP, as part of an UL sounding portion 810, sends a downlink trigger frame 812. After an SIFS, the STA may transmit the UL NDP 814a. The ToD of the UL NDP 814a is defined as t1. In addition, the trigger frame 812 may be broadcast to multiple stations. One or more stations may respond, after a SIFS, with a UL NDP 814a-814n. Thus, the AP is able to start the range estimation process with multiple stations.

In some embodiments, after receiving the UL NDP 814a-814n from each scheduled (or triggered) STA, the AP can determine the time of arrival (ToA) of the UL NDP 814a-814n from each STA in real time. This ToA is defined as t2. After the UL sounding portion 810, a downlink sounding portion 820 may be completed. The downlink sounding portion 820 may include the access point sending a DL NDPA 822 packet and a DL NDP packet 824. The time t2 may be sent back to the STAs in a DL NDPA packet 822. The DL NDPA packet 822 may also include the time of departure (ToD) of the DL NDP 824. This ToD is defined as t3. In some embodiments, t3 is sent to the STAs via the DL NDPA packet 822 before the DL NDP 824 packet is transmitted. In these embodiments, t3 is a future time when the DL NDP packet 824 will be transmitted. In these embodiments, the AP may control the transmission time of the DL NDP 824 such that t3 may be known in advance.

In some embodiments, after receiving the DL NDP 824, the STA will obtain the frequency domain channel estimation. The ToA of DL NDP 824 may be determined using the channel estimation. This ToA is defined as t4. Based on t1, t2, t3, and t4, the STAs may calculate the RTT.

In some embodiments, if only the STA needs the range information, the measurement sequence may end and a data exchange phase is not needed. As shown in timing diagram 800, the entire range messaging may be in one TXOP. The times t2 and t3 may be in a LMR frame aggregated with the DL NDPA frame 822. There may be no acknowledgement for the LMR frame. If an acknowledgement for the LMR is needed, another trigger frame and the ACK frames of the LMR may be needed. The additional trigger frame schedules the transmissions of the ACKs of the LMR. For example, the trigger frame and ACK frames may be in the measurement data exchange phase. For another example, the trigger frame may be aggregated with the DL NDPA. In some embodiments, a CSI report may be used instead of a LMR report. For the CSI report, there may be no acknowledgement.

Figure 9:
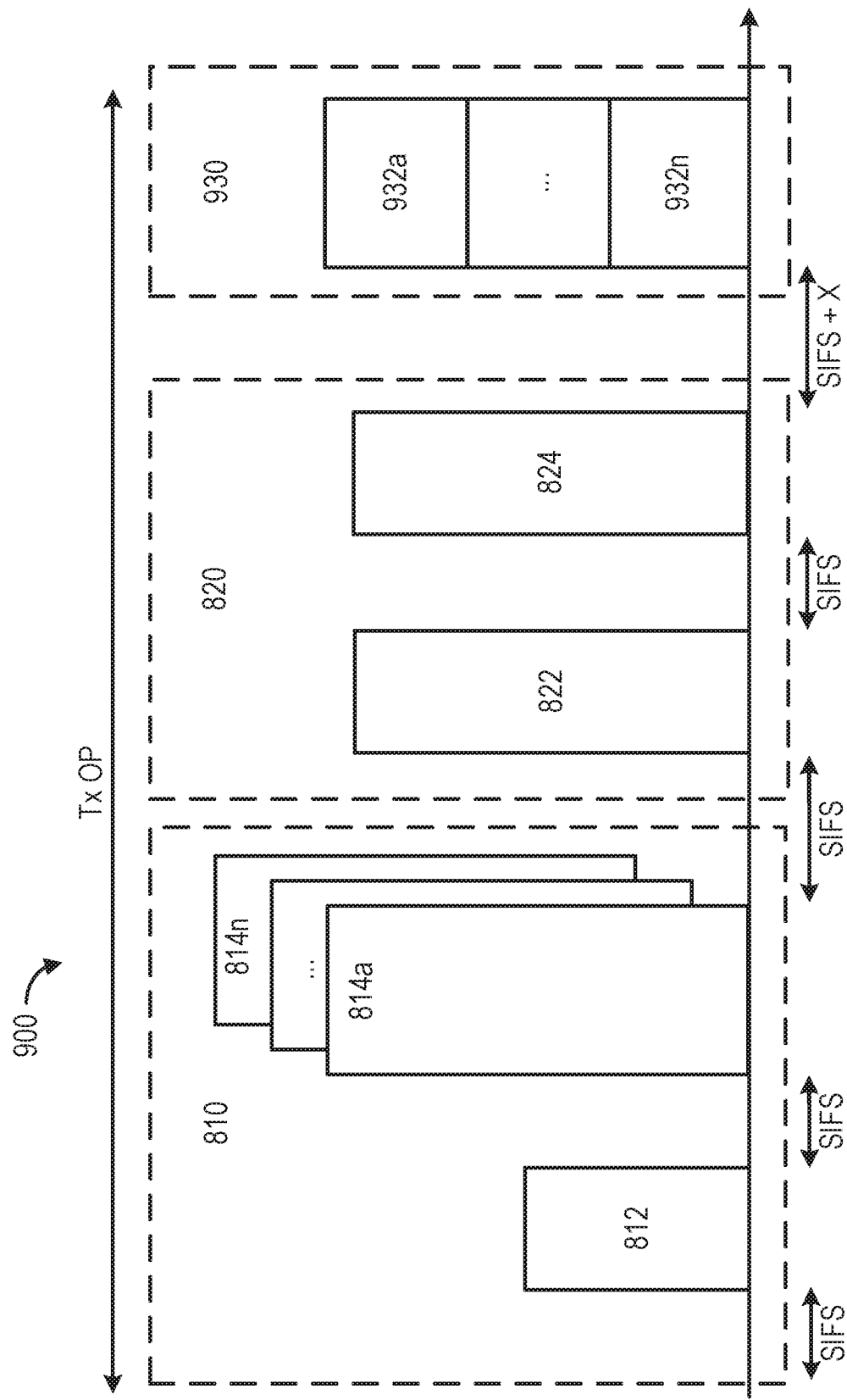
FIG. 9 illustrates a timing diagram where a mobile station can determine a round trip time (RTT) with no feedback acknowledgement in accordance with some embodiments.

In some embodiments, an AP may be unable to calculate and/or determine the times t2 or t3 in real time, e.g., within a SIFS. In an example, a separate LMR frame may be sent to provide a station with the times t2 and/or t3. FIG. 9 illustrates a timing diagram 900 where a mobile station can determine a round trip time (RTT) with no feedback acknowledgement in accordance with some embodiments. The timing diagram 900 starts in a similar manner as the timing diagram 800. One difference is that the DL DNPA does not include the times t2 and t3. Instead, as part of an AP2STA portion 930, a measurement data packet 932a is sent from the access point to the station. The measurement data packet 932a includes the times t2 and t3. The AP may send multiple measurement data packets 932a-932n to one or more stations. Thus, supporting simultaneous message range determinations of multiple STAs. Once received by the station, the station may calculate the RTT using t1, t2, t3, and t4 as described above. In an example, the measurement data packet is an LMR frame. In another example, the measurement data packet is a CSI frame. In the timing diagram 900, the station does not acknowledge the measurement data packets.

Figure 10:
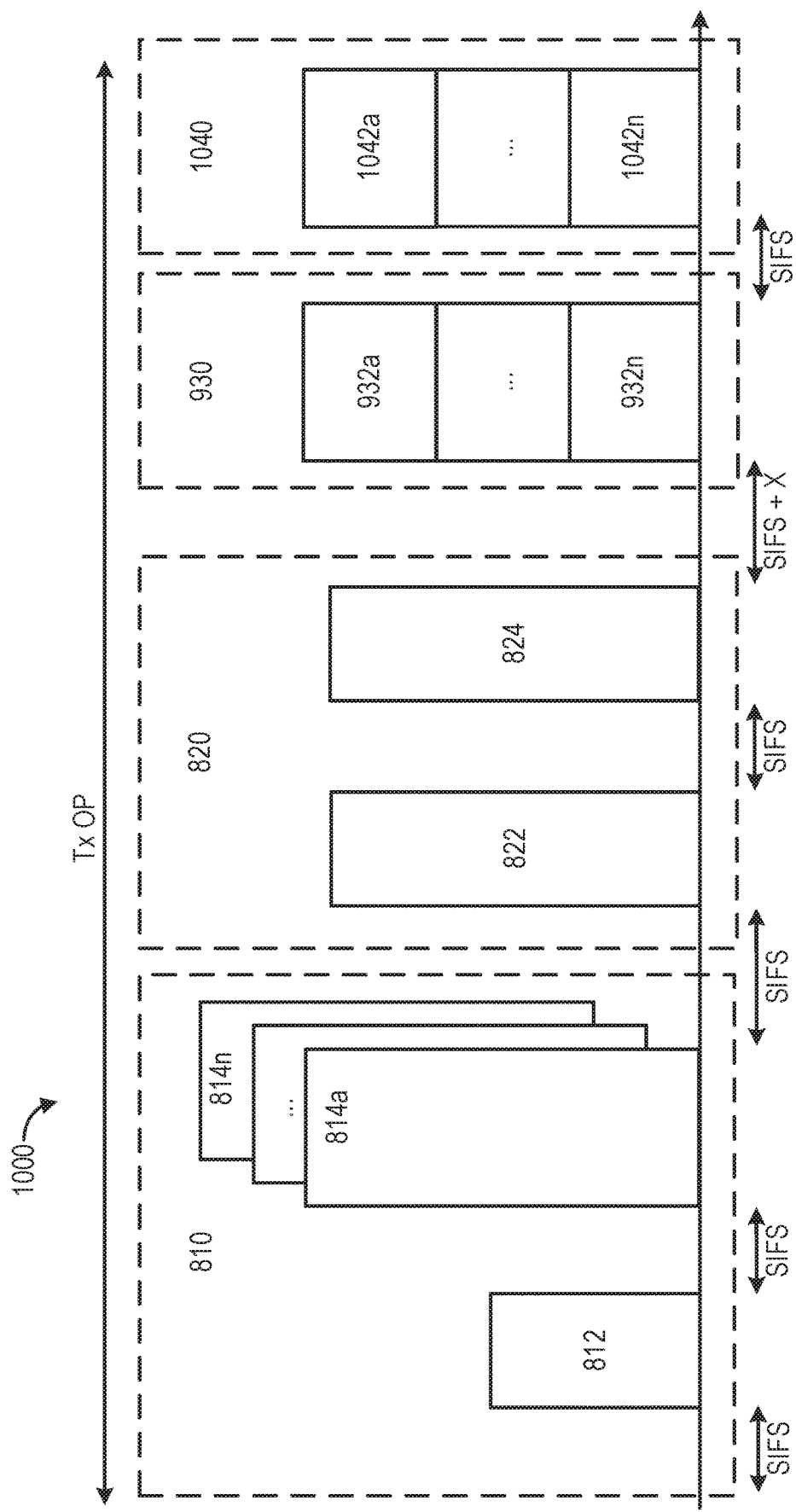
FIG. 10 illustrates a timing diagram where a mobile station can determine a round trip time (RTT) in accordance with some embodiments.

In an example, the measurement data packets are acknowledged. FIG. 10 illustrates a timing diagram 1000 where a mobile station can determine a round trip time (RTT) in accordance with some embodiments. Similar to the timing diagram in FIG. 9, the AP is unable to calculate the ToA of the UL NDP 814a within the SIFS leading up to the transmission of the UL NDPA 822. Accordingly, the UL NDPA 822 will not include the times t2 and t3 as described in relation to FIG. 8. The timing diagram 1000 includes the UL sounding portion 810, the DL sounding portion 820, and the AP2STA portion 930 as described in relation to FIGS. 8 and 9. The timing diagram 1000 also includes a STA2AP portion 1040 that may acknowledge the measurement data packet 932a from the AP2STA portion 930. As described above, in some embodiments, the times t2 and t3 are sent to the STAs using the measurement data packet 932a following the DL NDP 824. The interval between the DL NDP 824 and measurement data packet 932a is SIFS+X, where X is a variable which could be 0 or several milliseconds. The time in addition to the SIFS allows the AP to calculate/determine the times t2 and t3 that are included in the measurement data packet 932a. Depending on the value of X, the ranging packet exchange may be completed in one or two transmit opportunities.

In some embodiments, after receiving the data measurement packet 932a, e.g., a LMR or CSI from the AP, the STAs will have all the necessary information for calculating a RTT. In addition, as part of the STA2AP portion 1040, a station after a SIFS, may send a STA-to-AP (STA2AP) ACK frame 1042a to the AP. As multiple stations may be taking part in the range estimation, multiple stations may transmit a STA2AP ACK frame 1042a-1042n. As described above in FIG. 9, the ACK frames may not be sent.

Figure 11:
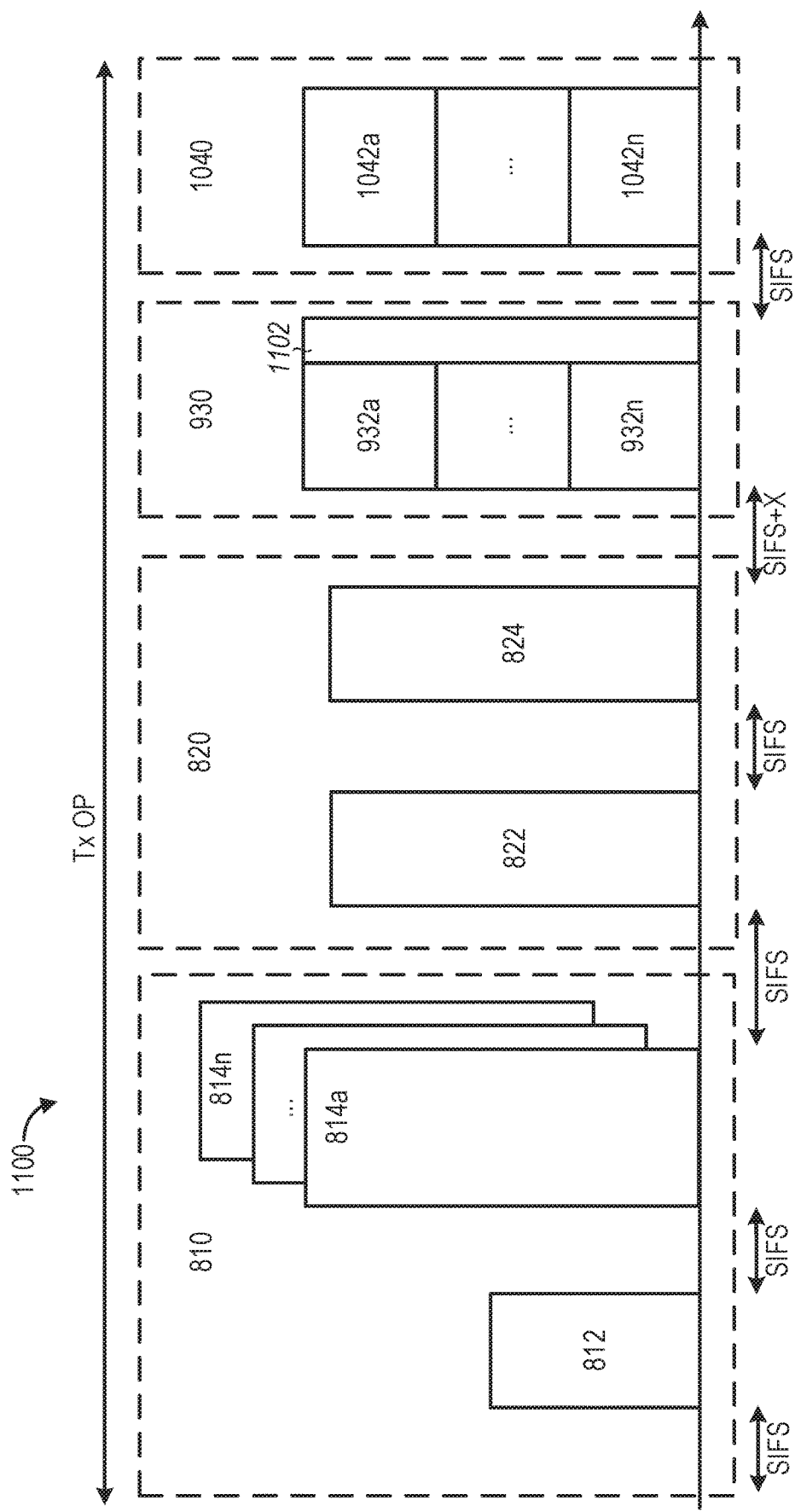
FIG. 11 illustrates a timing diagram where a mobile station can determine a round trip time (RTT) and an access point uses an aggregated trigger frame in accordance with some embodiments.

In some embodiments, an AP may trigger the station to acknowledge the measurement data packet 923a. FIG. 11 illustrates a timing diagram 1100 where a mobile station can determine a round trip time and an access point uses an aggregated trigger frame in accordance with some embodiments. The ranging process is similar to the process shown in the timing diagram 1000 of FIG. 10. A difference is a second trigger frame 1102 is aggregated with the data measurement packet 1032a. The trigger frame 1102 provides an indication to a station to acknowledge the data measurement packet 1032a.

Figure 12:
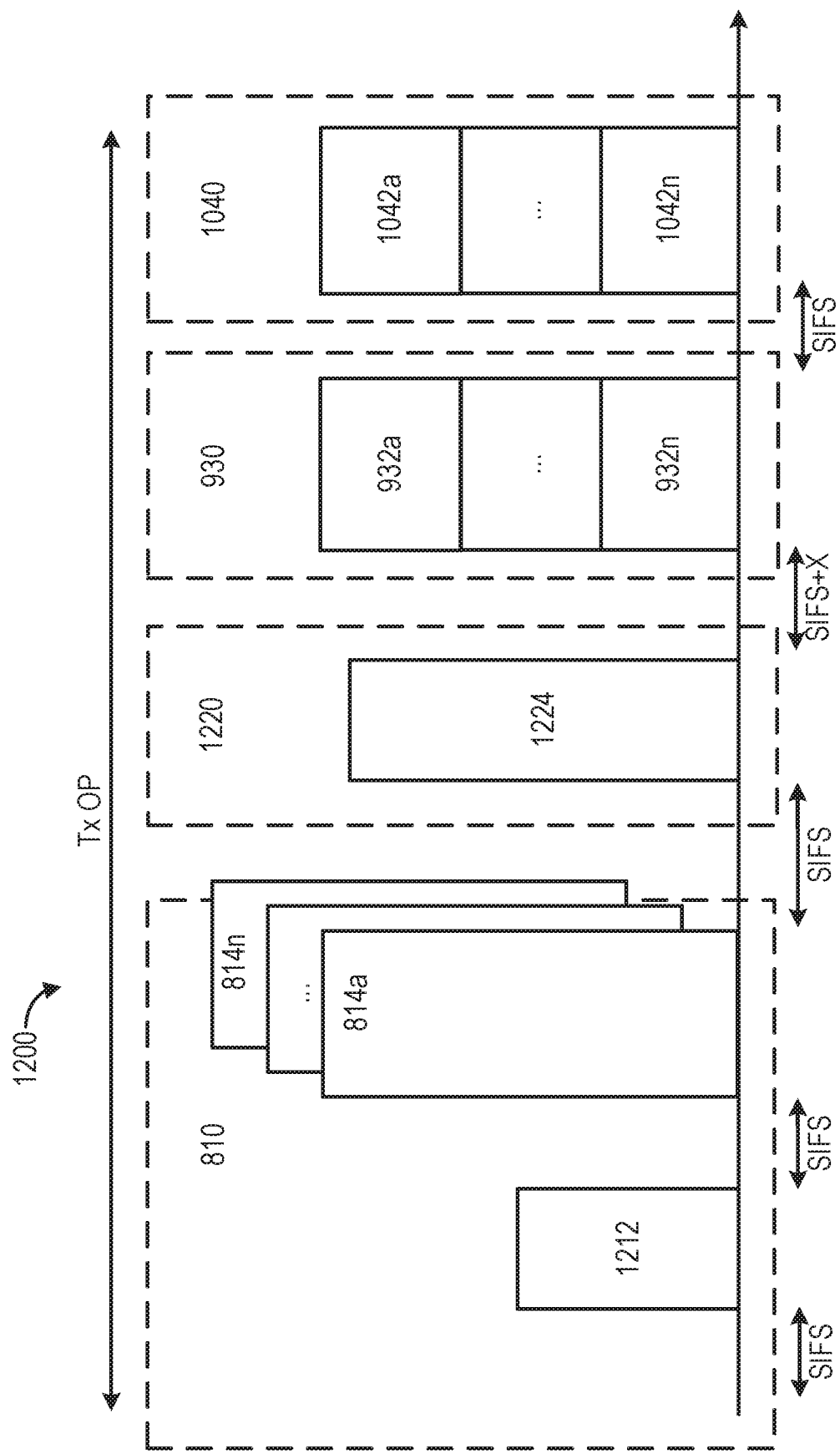
FIG. 12 illustrates a timing diagram showing an aggregated trigger frame and DL NDPA in accordance with some embodiments.

In an example, the UL sounding portion trigger frame may be aggregated with the DL NDPA of the DL sounding portion. FIG. 12 illustrates a timing diagram 1200 showing an aggregated trigger frame and DL NDPA in accordance with some embodiments. In this timing diagram, a trigger frame 1212 is integrated with a DL NDPA. Accordingly, a DL sounding portion 1220 includes a DL NDP 1224 but does not include a DL NDPA. Rather, the DL NDPA is part of the trigger frame 1212. In an embodiment, the trigger frame and DL NDPA are aggregated into a single packet using an aggregate MAC protocol data unit (A-MPDU). In some embodiments, in the aggregated packet, the trigger frame 1212 is used to solicit the UL NDP 814a and the DL NDPA is used to notify the STAs about the eventual DL NDP transmission 1224. As with the timing process described in FIG. 11, the ranging process may be completed in one or two transmit opportunities depending on the value of X.

Figure 13:
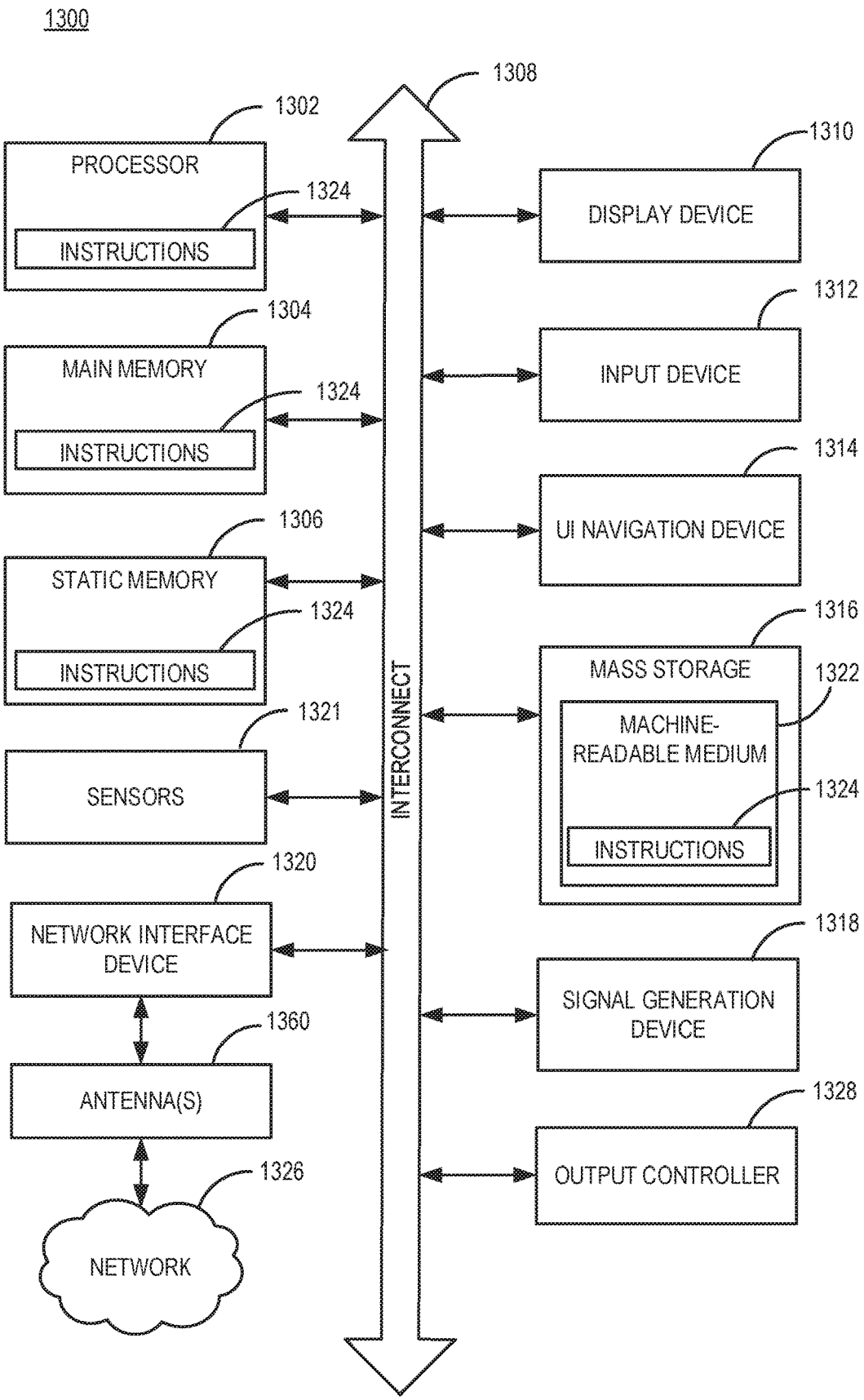
FIG. 13 illustrates a block diagram of an example machine upon which any one or more of the techniques (e.g., methodologies) discussed herein may perform.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308.

Specific examples of main memory 1304 include Random Access Memory (RAM), and semiconductor memory devices, which may include, in some embodiments, storage locations in semiconductors such as registers. Specific examples of static memory 1306 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1300 may further include a display device 1310, an input device 1312 (e.g., a keyboard), and a user interface (UI) navigation device 1314 (e.g., a mouse). In an example, the display device 1310, input device 1312 and UI navigation device 1314 may be a touch screen display. The machine 1300 may additionally include a mass storage (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1302 and/or instructions 1324 may comprise processing circuitry and/or transceiver circuitry.

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1322 is illustrated as a single medium, the term "machine readable medium" may include a single medium or multiple media (e.g., a centralized or distributed database, and/or associated caches and servers) configured to store the one or more instructions 1324.

An apparatus of the machine 1300 may be one or more of a hardware processor 1302 (e.g., a central processing unit (CPU), a graphics processing unit (GPU), a hardware processor core, or any combination thereof), a main memory 1304 and a static memory 1306, sensors 1321, network interface device 1320, antennas 1360, a display device 1310, an input device 1312, a UI navigation device 1314, a mass storage 1316, instructions 1324, a signal generation device 1318, and an output controller 1328. The apparatus may be configured to perform one or more of the methods and/or operations disclosed herein. The apparatus may be intended as a component of the machine 1300 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1320 may include one or more physical jacks (e.g., Ethernet, coaxial, or phone jacks) or one or more antennas to connect to the communications network 1326. In an example, the network interface device 1320 may include one or more antennas 1360 to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the machine 1300, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 14:
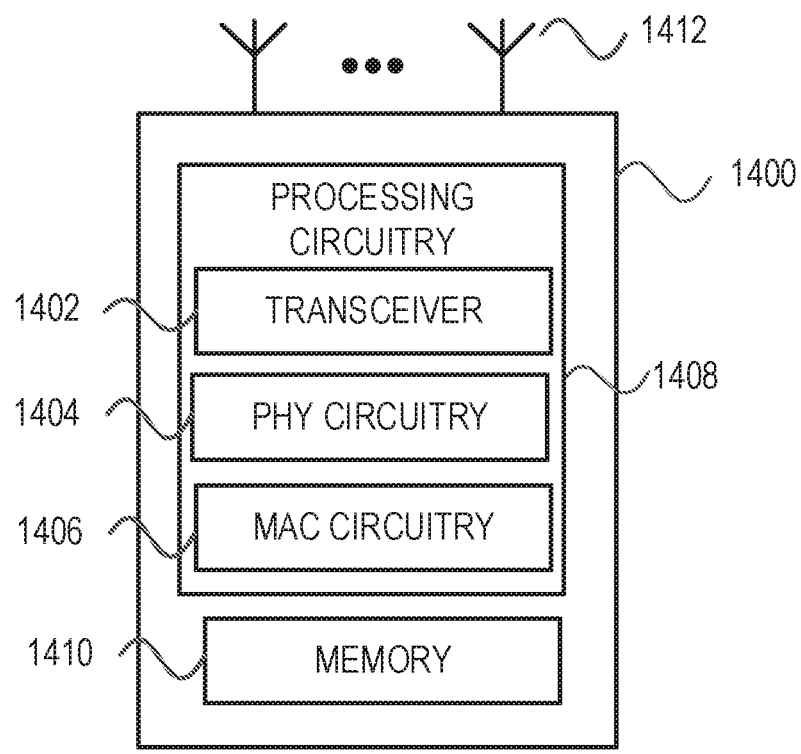
FIG. 14 illustrates a block diagram of an example wireless device upon which any one or more of the techniques (e.g., methodologies or operations) discussed herein may perform.

FIG. 14 illustrates a block diagram of an example wireless device 1400 upon which any one or more of the techniques (e.g., methodologies or operations) discussed herein may perform. The wireless device 1400 may be a HE device. The wireless device 1400 may be a HE STA 504 and/or HE AP 502 (e.g., FIG. 5). A HE STA 504 and/or HE AP 502 may include some or all of the components shown in FIGS. 1-5, 13, and 14. The wireless device 1400 may be an example machine 1300 as disclosed in conjunction with FIG. 13.

The wireless device 1400 may include processing circuitry 1408. The processing circuitry 1408 may include a transceiver 1402, physical layer circuitry (PHY circuitry) 1404, and MAC layer circuitry (MAC circuitry) 1406, one or more of which may enable transmission and reception of signals to and from other wireless devices 1400 (e.g., HE AP 502, HE STA 504, and/or legacy devices 506) using one or more antennas 1412. As an example, the PHY circuitry 1404 may perform various encoding and decoding functions that may include formation of baseband signals for transmission and decoding of received signals. As another example, the transceiver 1402 may perform various transmission and reception functions such as conversion of signals between a baseband range and a Radio Frequency (RF) range.

Accordingly, the PHY circuitry 1404 and the transceiver 1402 may be separate components or may be part of a combined component, e.g., processing circuitry 1408. In addition, some of the described functionality related to transmission and reception of signals may be performed by a combination that may include one, any or all of the PHY circuitry 1404 the transceiver 1402, MAC circuitry 1406, memory 1410, and other components or layers. The MAC circuitry 1406 may control access to the wireless medium. The wireless device 1400 may also include memory 1410 arranged to perform the operations described herein, e.g., some of the operations described herein may be performed by instructions stored in the memory 1410.

The antennas 1412 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1412 may be effectively separated to take advantage of spatial diversity and the different channel characteristics that may result.

One or more of the memory 1410, the transceiver 1402, the PHY circuitry 1404, the MAC circuitry 1406, the antennas 1412, and/or the processing circuitry 1408 may be coupled with one another. Moreover, although memory 1410, the transceiver 1402, the PHY circuitry 1404, the MAC circuitry 1406, the antennas 1412 are illustrated as separate components, one or more of memory 1410, the transceiver 1402, the PHY circuitry 1404, the MAC circuitry 1406, the antennas 1412 may be integrated in an electronic package or chip.

In some embodiments, the wireless device 1400 may be a mobile device as described in conjunction with FIG. 13. In some embodiments the wireless device 1400 may be configured to operate in accordance with one or more wireless communication standards as described herein (e.g., as described in conjunction with FIGS. 1-5 and 13, IEEE 802.11). In some embodiments, the wireless device 1400 may include one or more of the components as described in conjunction with FIG. 13 (e.g., display device 1310, input device 1312, etc.) Although the wireless device 1400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 1400 may include various components of the wireless device 1400 as shown in FIG. 14 and/or components from FIGS. 1-5 and 13. Accordingly, techniques and operations described herein that refer to the wireless device 1400 may be applicable to an apparatus for a wireless device 1400 (e.g., HE AP 502 and/or HE STA 504), in some embodiments. In some embodiments, the wireless device 1400 is configured to decode and/or encode signals, packets, and/or frames as described herein, e.g., PPDUs.

In some embodiments, the MAC circuitry 1406 may be arranged to contend for a wireless medium during a contention period to receive control of the medium for a HE TXOP and encode or decode a HE PPDU. In some embodiments, the MAC circuitry 1406 may be arranged to contend for the wireless medium based on channel contention settings, a transmitting power level, and a clear channel assessment level (e.g., an energy detect level).

The PHY circuitry 1404 may be arranged to transmit signals in accordance with one or more communication standards described herein. For example, the PHY circuitry 1404 may be configured to transmit a HE PPDU. The PHY circuitry 1404 may include circuitry for modulation/demodulation, upconversion/downconversion, filtering, amplification, etc. In some embodiments, the processing circuitry 1408 may include one or more processors. The processing circuitry 1408 may be configured to perform functions based on instructions being stored in a RAM or ROM, or based on special purpose circuitry. The processing circuitry 1408 may include a processor such as a general purpose processor or special purpose processor. The processing circuitry 1408 may implement one or more functions associated with antennas 1412, the transceiver 1402, the PHY circuitry 1404, the MAC circuitry 1406, and/or the memory 1410. In some embodiments, the processing circuitry 1408 may be configured to perform one or more of the functions/operations and/or methods described herein.

In mmWave technology, communication between a station (e.g., the HE stations 504 of FIG. 5 or wireless device 1400) and an access point (e.g., the HE AP 502 of FIG. 5 or wireless device 1400) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

ADDITIONAL NOTES AND EXAMPLES

Example 1 is an apparatus of a wireless device comprising memory; and processing circuitry coupled to the memory, the processing circuity configured to: encode a trigger frame for fine timing measurements (FTM) for one or more stations; receive uplink (UL) null data packets (NDPs) from the one or more stations; determine a time of arrival (ToA) of the UL NDPs for the one or more stations; determine a time of departure (ToD) of a downlink (DL) null data packet (NDP) to a station; encode a DL null data packet announcement (NDPA); encode the ToA and the ToD into a data packet; and configure the wireless device to transmit the data packet to the station.

In Example 2, the subject matter of Example 1 optionally includes wherein the processing circuitry is further configured to: determine the ToA of the UL NDPs within a short interframe space (SIFS), the processing circuity to determine the ToD prior to a transmission of the DL NDP, and the DL NDPA is the data packet.

In Example 3, the subject matter of Example 2 optionally includes wherein the processing circuitry is further configured to configure the wireless device to transmit the DL NDP to the station at the ToD, the ToD is a SIFS after the DL NDPA.

In Example 4, the subject matter of any one or more of Examples 1-3 optionally include wherein the processing circuitry is further configured to: encode a measurement data packet, the data packet is the measurement data packet; configure the wireless device to transmit the DL NDP to the station; and configure the wire device to transmit the measurement data packet after the DL NDP.

In Example 5, the subject matter of Example 4 optionally includes wherein the measurement data packet is a location measurement report (LMR) frame.

In Example 6, the subject matter of any one or more of Examples 4-5 optionally include wherein the measurement data packet is a channel state information (CSI) report.

In Example 7, the subject matter of any one or more of Examples 4-6 optionally include wherein the processing circuitry is further configured to receive an acknowledgment from the station.

In Example 8, the subject matter of Example 7 optionally includes wherein the processing circuitry is further configured to encode a second trigger frame into the measurement data packet.

In Example 9, the subject matter of any one or more of Examples 7-8 optionally include wherein the processing circuitry is further configured to encode the DL NDPA and the trigger frame into a single packet using an aggregate MAC protocol data unit.

In Example 10, the subject matter of any one or more of Examples 1-9 optionally include access point.

In Example 11, the subject matter of any one or more of Examples 1-10 optionally include transceiver circuitry coupled to the processing circuitry.

In Example 12, the subject matter of Example 11 optionally includes one or more antennas coupled to the transceiver circuitry.

Example 13 is a method performed by a wireless device, the method comprising: encoding a trigger frame for fine timing measurements (FTM) for one or more stations; receiving uplink (UL) null data packets (NDPs) from the one or more stations; determining a time of arrival (ToA) of the UL NDPs for the one or more stations; determining a time of departure (ToD) of a downlink (DL) null data packet (NDP) to a station; encoding a DL null data packet announcement (NDPA); encoding the ToA and the ToD into a data packet; and configuring the wireless device to transmit the data packet to the station.

In Example 14, the subject matter of Example 13 optionally includes estimating the ToA of the UL NDPs, the processing circuity to determine the ToD prior to a transmission of the DL NDP, and the DL NDPA is the data packet.

In Example 15, the subject matter of Example 14 optionally includes configuring the wireless device to transmit the DL NDP to the station at the ToD.

In Example 16, the subject matter of any one or more of Examples 13-15 optionally include encoding a measurement data packet, the data packet is the measurement data packet; configuring the wireless device to transmit the DL NDP to the station; and configuring the wire device to transmit the measurement data packet after the DL NDP.

In Example 17, the subject matter of Example 16 optionally includes wherein the measurement data packet is a location measurement report (LMR) frame.

In Example 18, the subject matter of any one or more of Examples 16-17 optionally include wherein the measurement data packet is a channel state information (CSI) report.

In Example 19, the subject matter of any one or more of Examples 16-18 optionally include receiving an acknowledgment from the station.

In Example 20, the subject matter of Example 19 optionally includes encoding a second trigger frame into the measurement data packet.

In Example 21, the subject matter of any one or more of Examples 19-20 optionally include encoding the DL NDPA and the trigger frame into a single packet using an aggregate MAC protocol data unit.

In Example 22, the subject matter of any one or more of Examples 13-21 optionally include access point.

Example 23 is a non-transitory computer-readable storage medium that stores instructions for execution by one or more processors, the instructions to configure the one or more processors to cause a wireless device to: encode a trigger frame for fine timing measurements (FTM) for one or more stations; receive uplink (UL) null data packets (NDPs) from the one or more stations; determine a time of arrival (ToA) of the UL NDPs for the one or more stations; determine a time of departure (ToD) of a downlink (DL) null data packet (NDP) to a station; encode a DL null data packet announcement (NDPA); encode the ToA and the ToD into a data packet; and configure the wireless device to transmit the data packet to the station.

In Example 24, the subject matter of Example 23 optionally includes wherein the processing circuitry is further configured to: determine the ToA of the UL NDPs, the processing circuity to determine the ToD prior to a transmission of the DL NDP, and the DL NDPA is the data packet.

In Example 25, the subject matter of Example 24 optionally includes wherein the processing circuitry is further configured to configure the wireless device to transmit the DL NDP to the station at the ToD.

In Example 26, the subject matter of any one or more of Examples 23-25 optionally include wherein the processing circuitry is further configured to: encode a measurement data packet, the data packet is the measurement data packet; configure the wireless device to transmit the DL NDP to the station; and configure the wire device to transmit the measurement data packet after the DL NDP.

In Example 27, the subject matter of Example 26 optionally includes wherein the measurement data packet is a location measurement report (LMR) frame.

In Example 28, the subject matter of any one or more of Examples 26-27 optionally include wherein the measurement data packet is a channel state information (CSI) report.

In Example 29, the subject matter of any one or more of Examples 26-28 optionally include wherein the processing circuitry is further configured to receive an acknowledgment from the station.

In Example 30, the subject matter of Example 29 optionally includes wherein the processing circuitry is further configured to encode a second trigger frame into the measurement data packet.

In Example 31, the subject matter of any one or more of Examples 29-30 optionally include wherein the processing circuitry is further configured to encode the DL NDPA and the trigger frame into a single packet using an aggregate MAC protocol data unit.

In Example 32, the subject matter of any one or more of Examples 23-31 optionally include access point.

Example 33 is an apparatus of a wireless device comprising memory; and processing circuitry coupled to the memory, the processing circuitry configured to: encode a trigger frame for fine timing measurements (FTM) for one or more stations; receive uplink (UL) null data packets (NDPs) from the one or more stations; determine a time of arrival (ToA) of the UL NDPs for the one or more stations; determine a time of departure (ToD) of a downlink (DL) null data packet (NDP) to a station; encode a DL null data packet announcement (NDPA); encode the ToA and the ToD into a data packet; and configure the wireless device to transmit the data packet to the station.

Example 34 is an apparatus of a station comprising memory; and processing circuitry coupled to the memory, the processing circuity configured to: decode a trigger frame from an associated wireless device; encode, in response to the trigger frame, an uplink (UL) null data packet (NDP); configure the station to transmit the UL NDP to the associated wireless device at a first time of departure (ToD); decode a downlink (DL) null data packet announcement (NDPA); decode, in response to decoding the DL NDPA, a data packet having packet timing information from the associated wireless device that includes a time of departure (ToD) of a DL NDP and a time of arrival (ToA) of the UL NDP at the associated wireless device; obtain a frequency domain channel estimation; determine a ToA of the DL NDP using the frequency domain channel estimation; and calculate a round trip time (RTT) for packet exchange using the timing information, the first ToD, and the ToA of the DL NDP.

In Example 35, the subject matter of Example 34 optionally includes the data packet is the DL NDPA.

In Example 36, the subject matter of any one or more of Examples 34-35 optionally include wherein the processing circuitry is further configured to decode, after the DL NDP, a measurement data packet, the data packet is the measurement data packet.

In Example 37, the subject matter of Example 36 optionally includes wherein the measurement data packet is a location measurement report (LMR) frame.

In Example 38, the subject matter of any one or more of Examples 36-37 optionally include wherein the measurement data packet is a channel state information (CSI) report.

In Example 39, the subject matter of any one or more of Examples 36-38 optionally include wherein the processing circuitry is further configured to encode, based upon the decoded measurement data packet, an acknowledgment to the station.

In Example 40, the subject matter of any one or more of Examples 34-39 optionally include wherein the processing circuitry is further configured to decode a second trigger frame from the measurement data packet.

In Example 41, the subject matter of any one or more of Examples 34-40 optionally include wherein the processing circuitry is further configured to decode the DL NDPA and the trigger frame from an aggregate MAC protocol data unit.

In Example 42, the subject matter of any one or more of Examples 34-41 optionally include access point.

In Example 43, the subject matter of any one or more of Examples 34-42 optionally include transceiver circuitry coupled to the processing circuitry.

In Example 44, the subject matter of Example 43 optionally includes one or more antennas coupled to the transceiver circuitry.

Example 45 is a method performed by a station, the method comprising: decoding a trigger frame from an associated wireless device; encoding, in response to the trigger frame, an uplink (UL) null data packet (NDP); configuring the station to transmit the UL NDP to the associated wireless device at a first time of departure (ToD); decoding a downlink (DL) null data packet announcement (NDPA); decoding, in response to decoding the DL NDPA, a data packet having packet timing information from the associated wireless device that includes a time of departure (ToD) of a DL NDP and a time of arrival (ToA) of the UL NDP at the associated wireless device; obtaining a frequency domain channel estimation; estimating a ToA of the DL NDP using the frequency domain channel estimation; and calculating a round trip time (RTT) for packet exchange using the timing information, the first ToD, and the ToA of the DL NDP.

In Example 46, the subject matter of Example 45 optionally includes the data packet is the DL NDPA.

In Example 47, the subject matter of any one or more of Examples 45-46 optionally include wherein the processing circuitry is further configured to decode, after the DL NDP, a measurement data packet, the data packet is the measurement data packet.

In Example 48, the subject matter of Example 47 optionally includes wherein the measurement data packet is a location measurement report (LMR) frame.

In Example 49, the subject matter of any one or more of Examples 47-48 optionally include wherein the measurement data packet is a channel state information (CSI) report.

In Example 50, the subject matter of any one or more of Examples 47-49 optionally include wherein the processing circuitry is further configured to encode, based upon the decoded measurement data packet, an acknowledgment to the station.

In Example 51, the subject matter of any one or more of Examples 45-50 optionally include wherein the processing circuitry is further configured to decode a second trigger frame from the measurement data packet.

In Example 52, the subject matter of any one or more of Examples 45-51 optionally include wherein the processing circuitry is further configured to decode the DL NDPA and the trigger frame from an aggregate MAC protocol data unit.

In Example 53, the subject matter of any one or more of Examples 45-52 optionally include access point.

In Example 54, the subject matter of any one or more of Examples 45-53 optionally include transceiver circuitry coupled to the processing circuitry.

In Example 55, the subject matter of Example 54 optionally includes one or more antennas coupled to the transceiver circuitry.

Example 56 is a non-transitory computer-readable storage medium that stores instructions for execution by one or more processors, the instructions to configure the one or more processors to cause a station to: decode a trigger frame from an associated wireless device; encode, in response to the trigger frame, an uplink (UL) null data packet (NDP); configure the station to transmit the UL NDP to the associated wireless device at a first time of departure (ToD); decode a downlink (DL) null data packet announcement (NDPA); decode, in response to decoding the DL NDPA, a data packet having packet timing information from the associated wireless device that includes a time of departure (ToD) of a DL NDP and a time of arrival (ToA) of the UL NDP at the associated wireless device; obtain a frequency domain channel estimation; determine a ToA of the DL NDP using the frequency domain channel estimation; and calculate a round trip time (RTT) for packet exchange using the timing information, the first ToD, and the ToA of the DL NDP.

In Example 57, the subject matter of Example 56 optionally includes the data packet is the DL NDPA.

In Example 58, the subject matter of any one or more of Examples 56-57 optionally include wherein the processing circuitry is further configured to decode, after the DL NDP, a measurement data packet, the data packet is the measurement data packet.

In Example 59, the subject matter of Example 58 optionally includes wherein the measurement data packet is a location measurement report (LMR) frame.

In Example 60, the subject matter of any one or more of Examples 58-59 optionally include wherein the measurement data packet is a channel state information (CSI) report.

In Example 61, the subject matter of any one or more of Examples 58-60 optionally include wherein the processing circuitry is further configured to encode, based upon the decoded measurement data packet, an acknowledgment to the station.

In Example 62, the subject matter of any one or more of Examples 56-61 optionally include wherein the processing circuitry is further configured to decode a second trigger frame from the measurement data packet.

In Example 63, the subject matter of any one or more of Examples 56-62 optionally include wherein the processing circuitry is further configured to decode the DL NDPA and the trigger frame from an aggregate MAC protocol data unit.

In Example 64, the subject matter of any one or more of Examples 56-63 optionally include access point.

In Example 65, the subject matter of any one or more of Examples 56-64 optionally include transceiver circuitry coupled to the processing circuitry.

In Example 66, the subject matter of Example 65 optionally includes one or more antennas coupled to the transceiver circuitry.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a station (STA), the STA configured for performing a fine timing measurement (FTM) protocol for position determination, the apparatus comprising memory; and processing circuitry coupled to the memory, the processing circuitry configured to:
   encode a ranging trigger frame for transmission to two or more other stations within a transmission opportunity (TXOP), the ranging trigger frame to solicit ranging responses from the two or more other stations that are participating in the FTM protocol;
   receive trigger based (TB) uplink (UL) null data packets (NDPs) from the two or more other stations within uplink resources allocated by the ranging trigger frame, the UL NDPs to be received within the TXOP a short-interframe spacing (SIFS) after transmission of the ranging trigger frame;
   encode a ranging NDP announcement (NDP-A) frame for transmission to the two or more other stations a SIFS after receipt of a last of the UL NDPs, the ranging NDP-A to announce that the STA will be transmitting DL NDPs;
   encode a ranging DL NDP for transmission to each of the two or more other stations a SIFS after transmission of the ranging NDP-A frame, the ranging NDP-A frame and the ranging DL NDP frames being transmitted within the TXOP; and
   encode a location measurement report (LMR) frame for transmission to each of the two or more STAs within the TXOP, the LMR frames encoded to include measurement results, the measurement results based on from the UL NDPs and the DL NDPs.

2. The apparatus of claim 1, wherein the processing circuitry is further configured to:
   determine a time of arrival (ToA) that the UL NDPs are received from the two or more other stations;
   determine a time of departure (ToD) that that each of the DL NDPs are transmitted to the two or more other stations; and
   encode the TOAs and ToDs in the LMR frame for transmission.

3. The apparatus of claim 2, wherein the TOAs and ToDs are stored in memory.

4. The apparatus of claim 1, wherein prior to transmission of the ranging trigger frame, the processing circuitry is configured to:
   encode a trigger frame to solicit participation in the FTM protocol from the two or more stations; and
   decode responses from the two or more stations indicating that an initiating one of the other stations is requesting to participate in the FTM protocol.

5. The apparatus of claim 4 wherein the trigger frame to solicit participation and the responses are within the TXOP.

6. The apparatus of claim 1, wherein the processing circuitry is further configured to aggregate the ranging NDP-A frame and the ranging DL NDP frames in an aggregate-MPDU.

7. The apparatus of claim 1, further comprising a direct conversion mixer, the direct conversion mixer configured to directly downconvert RF signals to baseband signals,
   wherein the processing circuitry is configured to encode the baseband signals to generate the ranging trigger frame.

8. The apparatus of claim 1, further comprising a super-heterodyne mixer, the super-heterodyne mixer configured to downconvert RF signals to intermediate frequency signals prior to generation of baseband signals,
   wherein the processing circuitry is configured to encode the baseband signals to generate the ranging trigger frame.

9. The apparatus of claim 1 further comprising: mixer circuitry to downconvert RF signal to baseband signals; and
   synthesizer circuitry, the synthesizer circuitry comprising one of a fractional-N synthesizer or a fractional N/N+1 synthesizer, the synthesizer circuitry configured to generate an output frequency for use by the mixer circuitry,
   wherein the processing circuitry is configured to encode the baseband signals to generate the ranging trigger frame.

10. The apparatus of claim 1 further comprising: mixer circuitry to downconvert RF signal to baseband signals; and
    synthesizer circuitry, the synthesizer circuitry comprising a delta-sigma synthesizer, the synthesizer circuitry configured to generate an output frequency for use by the mixer circuitry,
    wherein the processing circuitry is configured to encode the baseband signals to generate the ranging trigger frame.

11. A non-transitory computer-readable storage medium that stores instructions for execution by processing circuitry of a station (STA), the STA configured for performing a fine timing measurement (FTM) protocol for position determination, the processing circuitry configured to:
    encode a ranging trigger frame for transmission to two or more other stations within a transmission opportunity (TXOP), the ranging trigger frame to solicit ranging responses from the two or more other stations that are participating in the FTM protocol;
    receive trigger based (TB) uplink (UL) null data packets (NDPs) from the two or more other stations within uplink resources allocated by the ranging trigger frame, the UL NDPs to be received within the TXOP a short-interframe spacing (SIFS) after transmission of the ranging trigger frame;
    encode a ranging NDP announcement (NDP-A) frame for transmission to the two or more other stations a SIFS after receipt of a last of the UL NDPs, the ranging NDP-A to announce that the STA will be transmitting DL NDPs;
    encode a ranging DL NDP for transmission to each of the two or more other stations a SIFS after transmission of the ranging NDP-A frame, the ranging NDP-A frame and the ranging DL NDP frames being transmitted within the TXOP; and
    encode a location measurement report (LMR) frame for transmission to each of the two or more STAs within the TXOP, the LMR frames encoded to include measurement results, the measurement results based on from the UL NDPs and the DL NDPs.

12. The non-transitory computer-readable storage medium of claim 11, wherein the processing circuitry is further configured to:
    determine a time of arrival (ToA) that the UL NDPs are received from the two or more other stations;
    determine a time of departure (ToD) that that each of the DL NDPs are transmitted to the two or more other stations; and encode the TOAs and ToDs in the LMR frame for transmission.

13. The non-transitory computer-readable storage medium of claim 12, wherein the TOAs and ToDs are stored in memory.

14. The non-transitory computer-readable storage medium of claim 11, wherein prior to transmission of the ranging trigger frame, the processing circuitry is configured to:
   encode a trigger frame to solicit participation in the FTM protocol from the two or more stations; and
   decode responses from the two or more stations indicating that an initiating one of the other stations is requesting to participate in the FTM protocol.

15. The non-transitory computer-readable storage medium of claim 14 wherein the trigger frame to solicit participation and the responses are within the TXOP.

16. The non-transitory computer-readable storage medium of claim 11, wherein the processing circuitry is further configured to aggregate the ranging NDP-A frame and the ranging DL NDP frames in an aggregate-MPDU.

17. An apparatus of a station (STA), the STA configured for initiating a fine timing measurement (FTM) protocol for position determination, the apparatus comprising memory; and processing circuitry coupled to the memory, the processing circuitry configured to:
   decode a ranging trigger frame from a responding station within a transmission opportunity (TXOP), the ranging trigger frame to solicit ranging a response from the STA for participation in the FTM protocol;
   encode trigger based (TB) uplink (UL) null data packets (NDPs) for transmission within uplink resources allocated by the ranging trigger frame, the UL NDP to be transmitted within the TXOP a short-interframe spacing (SIFS) after receipt of the ranging trigger frame;
   decode a ranging NDP announcement (NDP-A) frame from the responding station, the ranging NDP-A to announce that the responding STA will be transmitting DL NDPs;
   decode a ranging DL NDP received from the responding station a SIFS after receipt of the ranging NDP-A frame, the ranging NDP-A frame and the ranging DL NDP frames being received within the TXOP; and
   encode a location measurement report (LMR) frame for transmission to the responding station within the TXOP, the LMR frames encoded to include measurement results, the measurement results based on from the UL NDP and the DL NDP.

18. The apparatus of claim 17 wherein prior to receipt of the ranging trigger frame, the processing circuitry is configured to:
   decode a trigger frame that is soliciting participation in the FTM protocol; and
   encode a response for transmission to the responding station indicating that the STA is requesting to participate in the FTM protocol.

* * * * *

UNITED STATES PATENT AND TRADEMARK OFFICE
CERTIFICATE OF CORRECTION

PATENT NO. : 10,880,771 B2  
APPLICATION NO. : 16/346469  
DATED : December 29, 2020  
INVENTOR(S) : Jiang et al.

Page 1 of 1

It is certified that error appears in the above-identified patent and that said Letters Patent is hereby corrected as shown below:

In the Claims

In Column 27, Line 44, in Claim 2, delete "that that" and insert --that-- therefor In Column 27, Line 47, in Claim 2, delete "TOAs" and insert --ToAs-- therefor In Column 27, Line 49, in Claim 3, delete "TOAs" and insert --ToAs-- therefor In Column 28, Line 65, in Claim 12, delete "that that" and insert --that-- therefor In Column 29, Line 1, in Claim 12, delete "TOAs" and insert --ToAs-- therefor In Column 29, Line 4, in Claim 13, delete "TOAs" and insert --ToAs-- therefor Signed and Sealed this  
Sixteenth Day of March, 2021

Drew Hirshfeld  
*Performing the Functions and Duties of the  
Under Secretary of Commerce for Intellectual Property and  
Director of the United States Patent and Trademark Office*